(12) United States Patent
Kauffmann

(10) Patent No.: US 11,577,651 B2
(45) Date of Patent: Feb. 14, 2023

(54) AESTHETIC DISPLAY UNIT FOR A VEHICLE

(71) Applicant: MOTHERSON INNOVATIONS COMPANY LIMITED, London (GB)

(72) Inventor: Maximilian Kauffmann, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 190 days.

(21) Appl. No.: 17/010,973

(22) Filed: Sep. 3, 2020

(65) Prior Publication Data

US 2021/0061174 A1 Mar. 4, 2021

(30) Foreign Application Priority Data

Sep. 4, 2019 (DE) ...................... 10 2019 123 740.8

(51) Int. Cl.
*B60R 1/12* (2006.01)
*B60K 35/00* (2006.01)
(52) U.S. Cl.
CPC ............... *B60R 1/12* (2013.01); *B60K 35/00* (2013.01); *B60K 2370/152* (2019.05); *B60K 2370/171* (2019.05); *B60K 2370/176* (2019.05); *B60K 2370/794* (2019.05); *B60R 2001/1253* (2013.01); *B60R 2300/00* (2013.01); *B60R 2300/308* (2013.01); *B60R 2300/8026* (2013.01)
(58) Field of Classification Search
CPC .............. B60R 1/12; B60R 2001/1253; B60R 2300/00; B60R 2300/308; B60R 2300/8026; B60R 2300/304; B60R 2300/8046; B60R 1/00; B60R 2300/802; B60R 2300/8066; B60R 2300/30; B60R 2300/305; B60K 35/00; B60K 2370/152; B60K 2370/171; B60K 2370/176; B60K 2370/794; B60K 2370/21; H04N 7/18
See application file for complete search history.

(56) References Cited

U.S. PATENT DOCUMENTS

| 10,017,114 | B2 * | 7/2018 | Bongwald | .......... G02B 27/0101 |
| 10,556,542 | B2 * | 2/2020 | Karner | ................... G09G 5/026 |
| 2010/0194596 | A1 * | 8/2010 | Wang | ....................... B60R 1/00 340/936 |

(Continued)

FOREIGN PATENT DOCUMENTS

| DE | 19708610 A1 | 9/1998 |
| DE | 102010001441 A1 | 8/2010 |

(Continued)

OTHER PUBLICATIONS

Great Britain Examination Report dated Mar. 1, 2021 of application No. GB 2013704.8.

(Continued)

*Primary Examiner* — James M Pontius
(74) *Attorney, Agent, or Firm* — Jones Day

(57) ABSTRACT

A method for providing one or more of a rear or a side view of a vehicle includes generating a video stream of images subsequently captured by at least one camera of the vehicle or of a virtual mirror device of the vehicle, processing the generated video stream, and displaying the generated video stream on at least one screen of a display unit of the vehicle or of the virtual mirror device.

12 Claims, 4 Drawing Sheets

(56) References Cited

U.S. PATENT DOCUMENTS

| | | | |
|---|---|---|---|
| 2014/0285666 A1* | 9/2014 | O'Connell | B60R 1/12 |
| | | | 348/148 |
| 2014/0347489 A1* | 11/2014 | Kumon | H04N 7/183 |
| | | | 348/148 |
| 2015/0045097 A1* | 2/2015 | Ignomirello | G02B 27/0101 |
| | | | 455/575.9 |
| 2016/0209647 A1* | 7/2016 | Fürsich | G02B 27/0075 |
| 2018/0134217 A1* | 5/2018 | Peterson | G06V 20/58 |
| 2019/0241126 A1 | 8/2019 | Murad et al. | |
| 2020/0052242 A1* | 2/2020 | So | B32B 17/06 |
| 2020/0271450 A1* | 8/2020 | Gorur Sheshagiri | G06F 1/163 |
| 2020/0286244 A1* | 9/2020 | Freeman-Powell | G06T 11/60 |
| 2021/0107400 A1* | 4/2021 | Erler | B60Q 3/283 |
| 2021/0155167 A1* | 5/2021 | Lynam | B62D 15/028 |

FOREIGN PATENT DOCUMENTS

| | | |
|---|---|---|
| EP | 2823998 A1 | 6/2014 |
| EP | 3608148 A1 | 2/2020 |
| GB | 2566524 A | 3/2019 |
| WO | WO 2013/093603 A1 | 6/2013 |

OTHER PUBLICATIONS

German Office Action dated Feb. 17, 2020 of German application No. DE 102019123740.8.

* cited by examiner

AESTHETIC DISPLAY UNIT FOR A VEHICLE

CROSS-REFERENCE TO RELATED APPLICATION

This application claims the benefit of foreign priority to German Patent Application No. DE 10 2019 123 740.8, filed Sep. 4, 2019, which is hereby incorporated by reference in its entirety for all purposes.

BACKGROUND

1. Field of the Invention

The present disclosure relates to a method for providing a rear and/or side view of a vehicle. Furthermore, the present disclosure relates to a virtual mirror device for a vehicle, an internal surface for a vehicle and a vehicle.

2. Related Art

Conventional rear-view mirrors are going to be gradually replaced by virtual rear-view mirrors. This replacement will further progress with an increasing use of electric vehicles.

Virtual rear-view mirrors are configured for providing a rear and/or side view of a vehicle and have a camera being mounted externally to a door of the vehicle and an internal display unit being mounted internally to the door of the vehicle. Both the camera and the display unit are connected to an image processing unit. The image processing unit receives a video stream from the camera which is generated from images subsequently captured by the camera. After processing the video stream the image processing unit transmits the processed video stream to the display unit. The display unit displays the video stream to be watched by a driver of the vehicle.

US 2014/0139676 A1 discloses vision system for a vehicle, the vision system comprising a virtual rear-view mirror and being configured for displaying recognized real objects as avatars thus allowing for displaying completely even partially hidden objects.

A generic method is known from DE 10 2010 001 441 A1. The method uses a display device for a vehicle, comprising a recording element for recording a predetermined area around the vehicle to obtain a recorded image around the vehicle; and an image conversion element for converting coordinates of the recorded image to produce a mirror conversion image, wherein the mirror conversion image provides a first image of a first area around the vehicle which is reflected at an in-vehicle mirror, wherein the first image is viewed by an passenger of the vehicle, and wherein the passenger is seated on a predetermined seat of the vehicle; and a display element for displaying the mirror conversion image.

DE 197 08 610 A1 describes a pixel matrix display device for information display in transport systems, in which one pixel is realised by an organic light-emitting element.

Although virtual mirror devices are designed to simulate conventional mirrors as far as possible the display units are difficult to aesthetically integrate into a passenger compartment of a vehicle and screens of the display units generally are flat and have a rectangular contour differing from curved contours of conventional rear-view mirrors. Due to the rectangular contour the driver may be disturbed or distracted by irrelevant portions of the scene displayed on the screen which would not be visible on a conventional rear-view mirror due to its curved contour.

It would be therefore desirable to improve the appearance of the display unit of the virtual mirror device and to reduce any disturbance or distraction of the driver of the vehicle when using the virtual mirror device.

SUMMARY

In an aspect, a method for providing a rear and/or side view of a vehicle is provided, which supports an aesthetic appearance thereof and supports a driver of the vehicle in focusing. A virtual mirror device for a vehicle, an internal surface for a vehicle and a vehicle are also provided.

In an aspect, a method for providing a rear and/or side view of a vehicle includes the steps of generating a video stream of images subsequently captured by at least one camera of the vehicle, in particular of a virtual mirror device of the vehicle; processing the generated video stream by an image processing unit of the virtual mirror device; and displaying the generated video stream on at least one screen of a display unit of the vehicle, in particular of the virtual mirror device.

Hereby the processing comprises inserting a partial overlay into each image of the video stream. The partial overlay replaces a portion of the video stream by a replacement content in order to remove an irrelevant or disturbing portion of the video stream, thus supporting a driver of the vehicle in focusing on relevant portions of the screen.

It is pointed out that inserting an overlay is not equivalent to simply removing a corresponding portion of the video stream. While in the former case something is displayed, in the latter case nothing is displayed. Displaying nothing, i.e. displaying a black area, however, may easily result in an undesirable appearance of the display unit due to a background light of the screen. This effect may even be worse if a display surface of the screen deviates from flatness.

The inserted partial overlay is to be constant and/or selectable and/or textured by an image processing unit of the vehicle, in particular of the virtual mirror device, for visually simulating a predetermined surface. The replacement content of the partial overlay is generated by the image processing unit. Generating the replacement content for simulating the predetermined surface prevents the partial overlay from disturbing or distracting the driver of the vehicle increasing the comfort of the virtual mirror device. Apart from that, simulating the predetermined surface may render aesthetic the appearance of the display unit of the virtual mirror device.

The predetermined surface matches a surface surrounding the screen. With a texture matching the surrounding surface of the screen the partial overlay visually integrates the screen into the surrounding surface achieving a very aesthetic appearance of the virtual mirror device. In this case the texture of the partial overlay may be based on a photo of the surrounding surface.

In further example embodiments the partial overlay is inserted dependent on at least one parameter characteristic for a driving situation of the vehicle, preferably being characteristic for the driving velocity. Accordingly, the virtual mirror device may respond to a changing driving situation of the vehicle, i.e. the partial overlay is not inserted unconditionally. In driving situations requiring the driver's focus the overlay is inserted while in different driving situations requiring a full overview of the driver the overlay is not inserted.

The partial overlay may be advantageously inserted at any driving velocity exceeding a predetermined minimal driving velocity. The driving velocity may be determined such that the overlay is inserted when the vehicle uses a high way with regular traffic conditions. At a higher velocity pixels of the screen change faster resulting in a disturbance or distraction of the driver. Inserting the partial overlay reduces the number of changing pixels wherein a disturbance or distraction of the driver by the virtual mirror device is also reduced.

In some embodiments, the partial overlay covers up to around 30% of the screen and/or reduces the displayed video stream to a selected region of the screen, preferably determined by legal requirements and/or by the driver of the vehicle and/or adapts the region of the screen displaying the video stream of images to the shape of an exterior mirror. In other words, around 70% of the images of the video stream remain visible to the driver. The partial overlay, hence, removes up to a third of the video stream while more than two thirds remain visible to the driver.

In other embodiments, the partial overlay is contoured by the image processing to have a concave rim section towards the vehicle body and/or to be dependent on at least one parameter characteristic for a driving situation and/or at least one object being recognized by a pattern recognition module of the image processing unit. The concave rim section simulates a rim section of a conventional rear-view mirror, thus allowing the driver to possibly keep on using the virtual mirror device like a conventional rear-view mirror without changing a routine.

In still other embodiments the partial overlay is contoured dependent on a relevant object being recognized by a pattern recognition module of the image processing unit. The pattern recognition module scans the images of the video stream for predetermined relevant patterns defining relevant objects or the video stream for conspicuous movements of an object recognized in the images of the video stream. The relevant patterns may comprise other vehicles, passengers, bicyclists and the like. Conspicuous movements may for instance comprise a sudden change of direction or velocity or a close approach. The image processing unit contours the partial overlay to enclose the relevant object.

Alternatively or additionally, a relevant object may be identified by means of sensors of the vehicle. The sensors may comprise a proximity switch for detecting the object to come close to the vehicle.

A color management system (CMS) of the image processing unit may adjust a coloring of each image of the video stream for compensating a tint caused by a plurality of tinted particles embedded in the screen. Without any measure, the tinted particles would tint the displayed video stream. This tint can be removed from the videos stream by adjusting a coloring thereof in a compensating manner. With the color adjustment the video stream is substantially displayed as if there were not any tinted particles embedded in the screen.

The above mentioned need may also be complied by a virtual mirror device for providing a rear and/or side view of a vehicle using an inventive method, with the virtual mirror device comprising at least one camera for subsequently capturing images and generating a video stream thereof, an image processing unit connected to the camera for processing the generated video stream and a display unit connected to the image processing unit for displaying the processed video stream on at least one screen of the display unit. Virtual mirror devices are to replace conventional mirrors and able to provide more functionality In an example, the image processing unit is configured for inserting a constant partial overlay into each image of the video stream. The inserted partial overlay supports the driver in focusing.

In a further example embodiment a texture of the inserted partial overlay visually simulates a predetermined surface. Thus, the displayed overlay can provide the display unit with an aesthetic appearance.

In another example embodiment a display surface of the screen is providing by a class A surface. The class A surface is smooth, i.e. does not have any edges, and may nonetheless deviate from flatness. Consequently, the display surface may be smoothly integrated in any surrounding class A surface, thus achieving a very aesthetic appearance of the display unit.

In some embodiments the display surface has a bonded cover glass or plastic glass. In other words, the display surface has a layered structure allowing different layers of the display surface for providing different functions.

The screen may be advantageously configured as a liquid crystal display (LCD). Liquid crystal displays are widely used in modern vehicles and have proven to be very economic and reliable.

In examples, a plurality of tinted particles are provided by the screen or a layer of the screen. The appearance of the screen may be defined and improved by embedding tinted particles therein. The tinted particles allow the display unit for visually matching a surface surrounding the display unit, even when the virtual mirror device is switched off. The visual integration in the surrounding surface renders the appearance of the display particularly aesthetic.

The color management system may be configured to adjust a coloring of each image of the video stream for compensating a tint caused by the plurality of tinted particles embedded in the screen. The color management system ensures the displayed video stream to not be impaired by the tinted particles.

In still another embodiment the predetermined surface matches a surface surrounding the screen. The image processing unit is configured to texture the partial overlay for visually simulating the surrounding surface for an aesthetic appearance when the partial overlay is inserted. The texture of the partial overlay may be based on a photo of the surrounding surface.

In many embodiments the virtual mirror device is configured as a rear-view mirror displaying a scene behind the vehicle. The camera is mounted externally to a door of the vehicle and preferably is configured as a wide-angle camera to provide the driver with a wide field of view (FOV). Nonetheless, the camera requires substantially less space than a conventional rear-view mirror. Thus, the aerodynamic drag of the vehicle is reduced and an efficiency of the vehicle is increased. The display unit may be distant from the camera and may be arranged internally, i.e. in a passenger compartment of the vehicle. Advantageously, the display unit is mounted internally to the door of the vehicle.

In examples the virtual mirror device is configured to carry out a method as described above. By carrying out the method the virtual mirror device may reduce a disturbance or distraction of the driver and may improve an appearance of the display unit.

Furthermore, the above mentioned problem may be solved by an internal surface for a vehicle, being configured as a class A surface and having a screen smoothly integrated therein for providing a rear/side view by using a method according to the invention and/or a virtual mirror device according to the invention, the screen being. The internal surface may be an inner surface of a door of the vehicle, particularly a front door of the vehicle. The internal surface with the integrated screen has a particularly aesthetic appearance.

The above mentioned need may further be complied by a vehicle, having a passenger compartment with an internal surface, the internal surface being an internal surface of a door of the vehicle. The vehicle has an inventive mirror device which may be configured as a rear-view mirror and, hence, due to the absence of any external conventional rear-view mirror little aerodynamic drag, i.e. a high efficiency.

In many embodiments the internal surface comprises fabric, leather, metal or glass, and/or the inserted partial overlay simulates the internal surface. Fabric, leather, metal and glass are common materials the internal surface of the door may be made of. The respective textures may be simulated by the inserted partial overlay.

Preferably, the driver of the vehicle watching the screen is not distracted or disturbed by irrelevant portions of the images of the video stream presented by the virtual mirror device. In addition, the partial overlay removing the irrelevant portions of the images and being displayed on the screen of the display unit yield an aesthetic and comfortable appearance of the display unit of the virtual mirror device.

The above listed embodiments can be used individually or in any combination to provide the device and the process in accordance with the invention.

BRIEF DESCRIPTION OF THE DRAWINGS

These and other aspects of the invention are shown in detail in the illustrations as follows.

DETAILED DESCRIPTION

Figure 1:
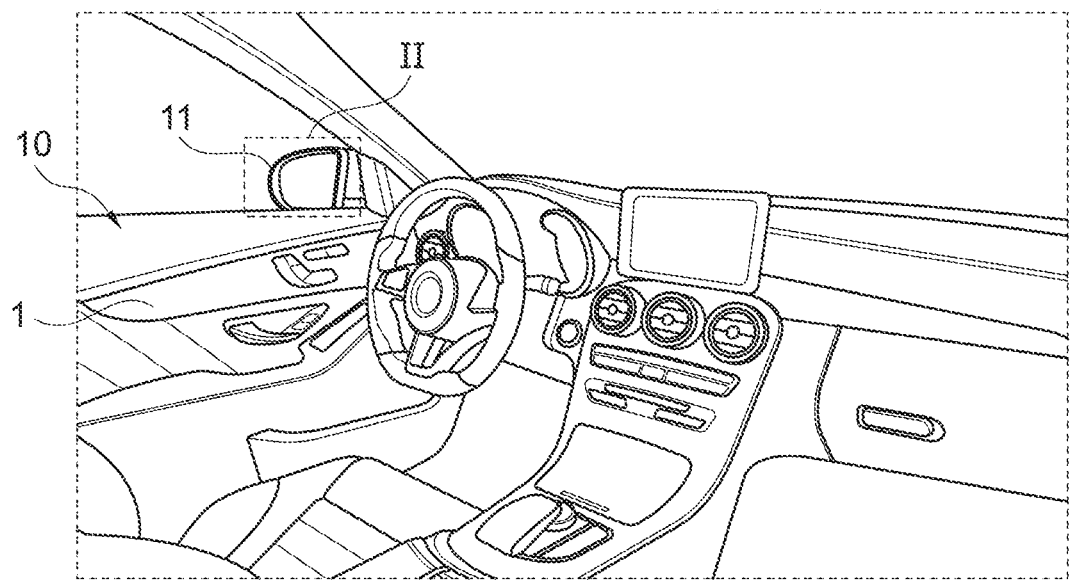
FIG. 1 is an internal partial view of a passenger compartment of a vehicle according to prior art.

FIG. 1 shows an internal partial view of a passenger compartment of a vehicle according to prior art. The vehicle has a right front door 10 with an internal surface 1 being at least partly configured as a class A surface, i.e. a smooth surface without any edges therein, and an external conventional rear-view mirror 11. The internal surface 1 comprises a plurality of materials like fabric, leather, scratched metal and glass.

Figure 2:
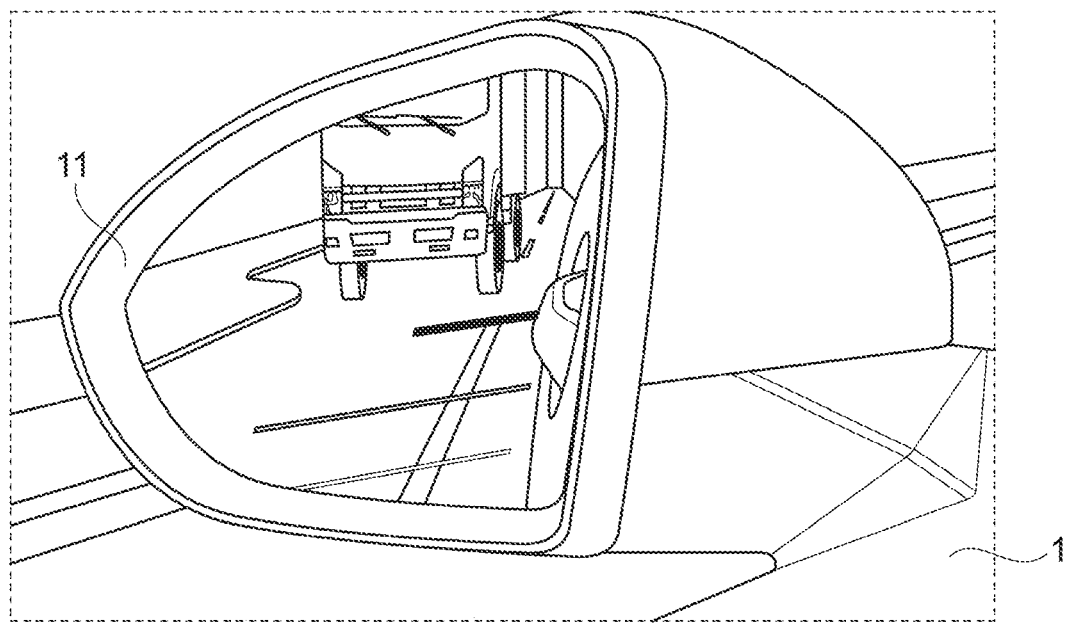
FIG. 2 is an enlarged view of a detail of FIG. 1 referenced by II showing a conventional rear-view mirror.

FIG. 2 shows an enlarged view of a detail of FIG. 2 referenced by II. The detail shows the external conventional rear-view mirror 11. The external conventional rear-view mirror 11 as usual has a mirror housing foldable relative to the door 10 and a reflective plate pivotably supported by the mirror housing. The reflective plate has a substantially flat section adjacent to the door 10 for providing a image of a scene behind the vehicle substantially without any distortion and an aspheric section distant from the door 10 for horizontally widening the field of vision (FOV).

Figure 3:
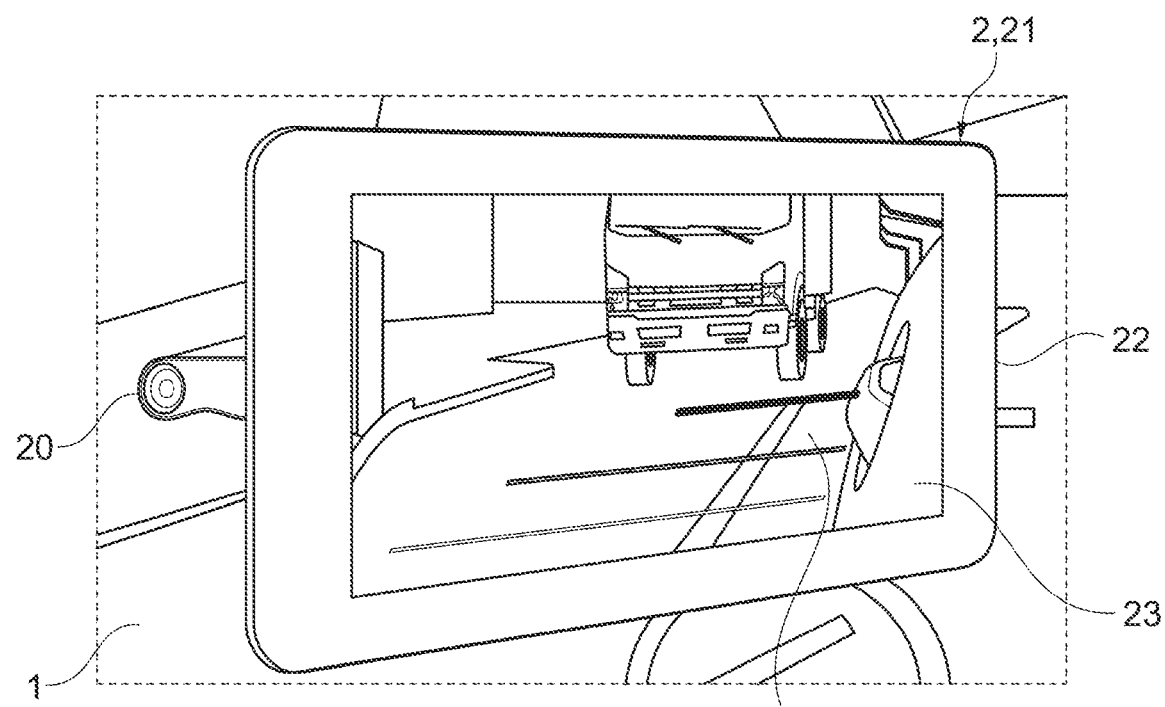
FIG. 3 is a virtual mirror device according to an embodiment of the invention.

FIG. 3 shows a virtual mirror device 2 according to an embodiment of the invention for providing a rear and/or side view of a vehicle. The virtual mirror device 2 is configured as a rear-view mirror for displaying a scene behind the vehicle. The vehicle, in particular the virtual mirror device 2 of the vehicle comprises an external wide-angle camera 20 being directed rearward for subsequently capturing images 3 of the scene behind the vehicle and generating a video stream thereof. Furthermore, the vehicle, in particular the virtual mirror device 2 has an image processing unit 21 (hidden) for processing the generated video stream which is connected to the camera 20. The image processing unit 21 has a color management system (CMS).

The image processing unit 21 is configured for horizontally narrowing a section of the FOV of the camera 20 in order to simulate the aspheric section of the conventional rear-view mirror 11. The vehicle, in particular the virtual mirror device 2 additionally has an internal display unit 22 for displaying the processed video stream on a flat rectangular screen 23 of the display unit 22. The screen 23 is a liquid crystal display (LCD) and has a display surface being configured as a bonded cover glass or plastic glass providing by a class A surface of the screen 23. The display unit 22 is connected to the image processing unit 21 and may accommodate the image processing unit 21.

The screen 23 or a layer of the screen 23 comprises a plurality of tinted particles for providing a tinted appearance, i.e. a plurality of tinted particles are provided by the screen 23 or a layer of the screen 23. Accordingly, the color management system of the image processing unit 21 is configured to adjust a coloring of each image 3 of the video stream for compensating the tint caused by the plurality of tinted particles embedded in the screen 23.

The image processing unit 21 is further configured for inserting a constant partial overlay 30 into each image 3 of the video stream. The partial overlay 30 covers up to around 30% of the screen 23 suppressing irrelevant issues of the scene behind the vehicle, i.e. around 70% of the image 3 remain visible to a driver of the vehicle supporting him in focusing attention to relevant issues of the scene behind the vehicle. In detail, the partial overlay 30 may reduce the displayed video stream to a selected region of the screen, preferably determined by legal requirements and/or by the driver of the vehicle and/or adapts the region of the screen displaying the video stream of images to the shape of an exterior mirror.

Figure 4:
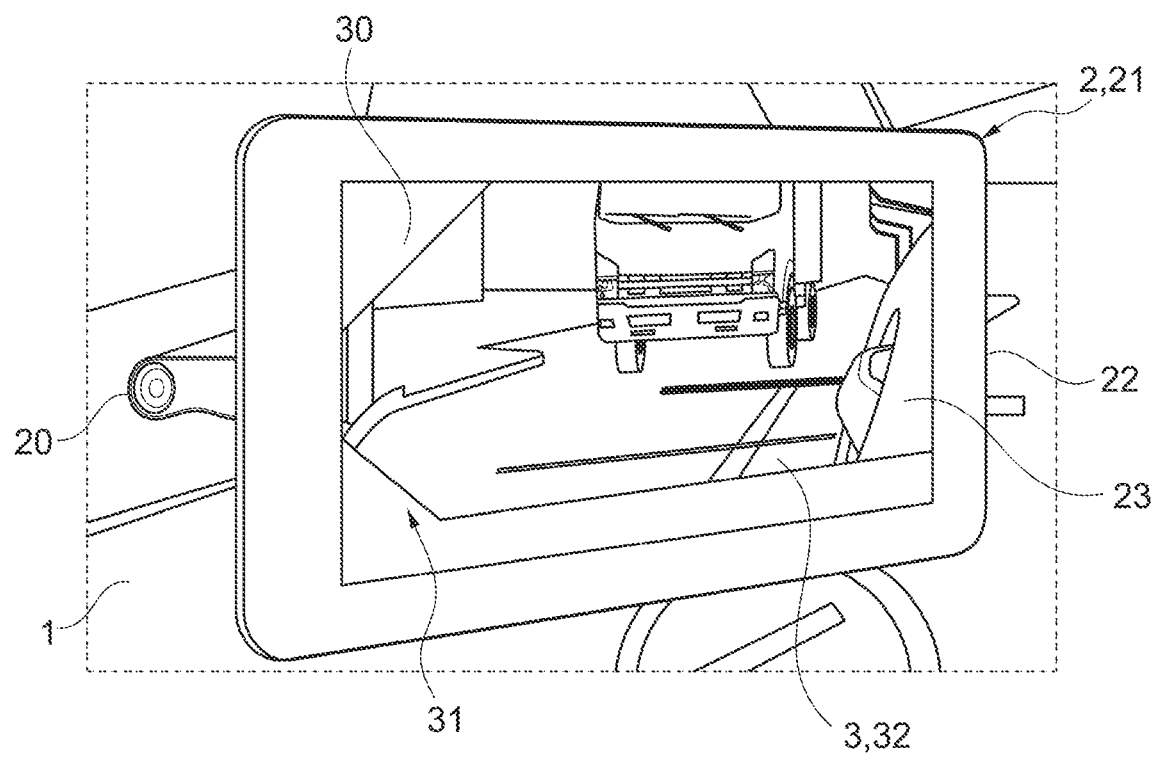
FIG. 4 is the virtual mirror device shown in FIG. 3 with a first partial overlay.

FIG. 4 shows the virtual mirror device 2 with a first partial overlay 30. The partial overlay 30 has a black color and an angled rim section 31 for removing corner parts of the image 3, thus simulating the contour of the reflective plate of the conventional rear-view mirror 11.

Figure 5:
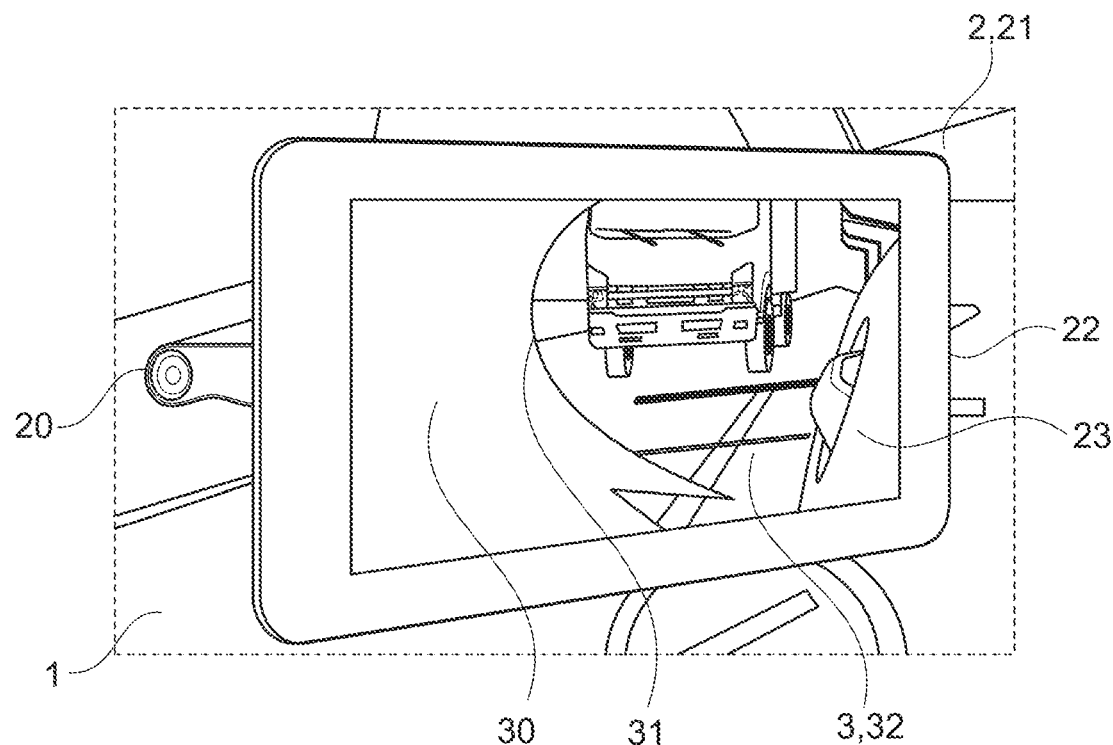
FIG. 5 is the virtual mirror device shown in FIG. 3 with a second partial overlay.

FIG. 5 shows the virtual mirror device 2 with a second partial overlay 30. The partial overlay 30 has a black color and a concave rim section 31 towards the body of the vehicle for removing corner parts of the image 3, thus even better simulating the convex contour section of the reflective plate of the conventional rear-view mirror 11. The partial overlay 30 may additionally be contoured dependent on a relevant object being recognized by a pattern recognition module of the image processing unit 21.

Figure 6:
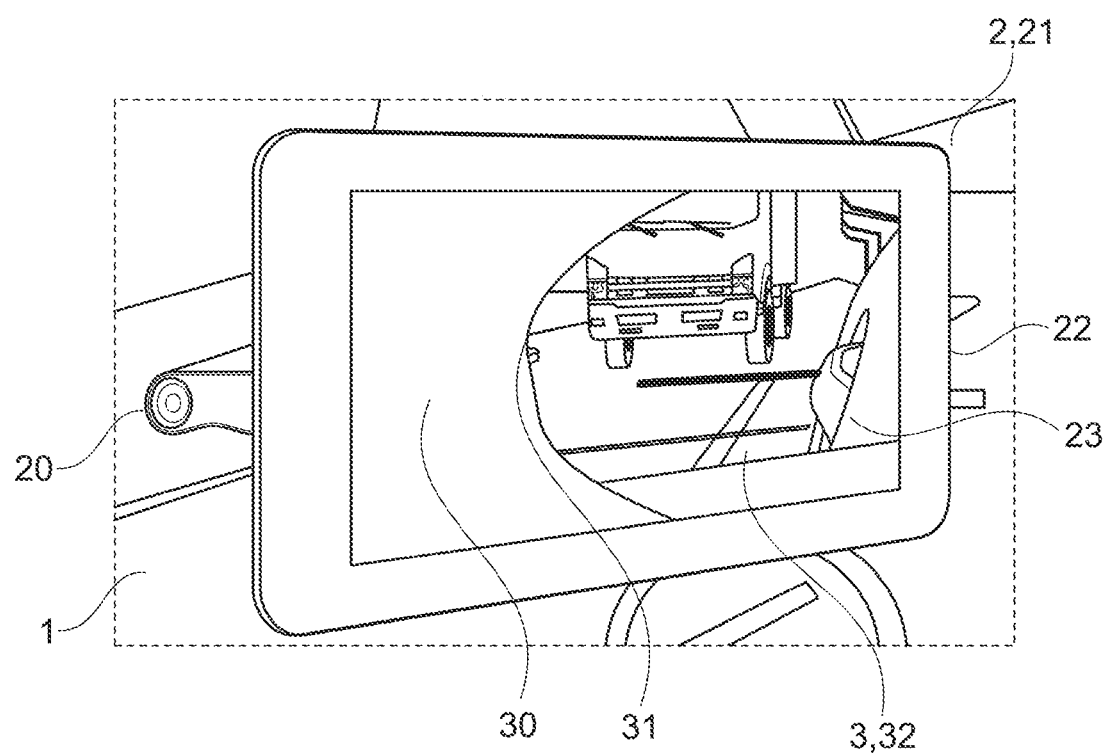
FIG. 6 is the virtual mirror device shown in FIG. 3 with a third partial overlay.

FIG. 6 shows the virtual mirror device 2 with a third partial overlay 30. The partial overlay 30 has the same contour as shown in FIG. 5, but instead of a black color the partial overlay 30 with concave rim section 31 has a texture visually simulating a predetermined surface.

Figure 7:
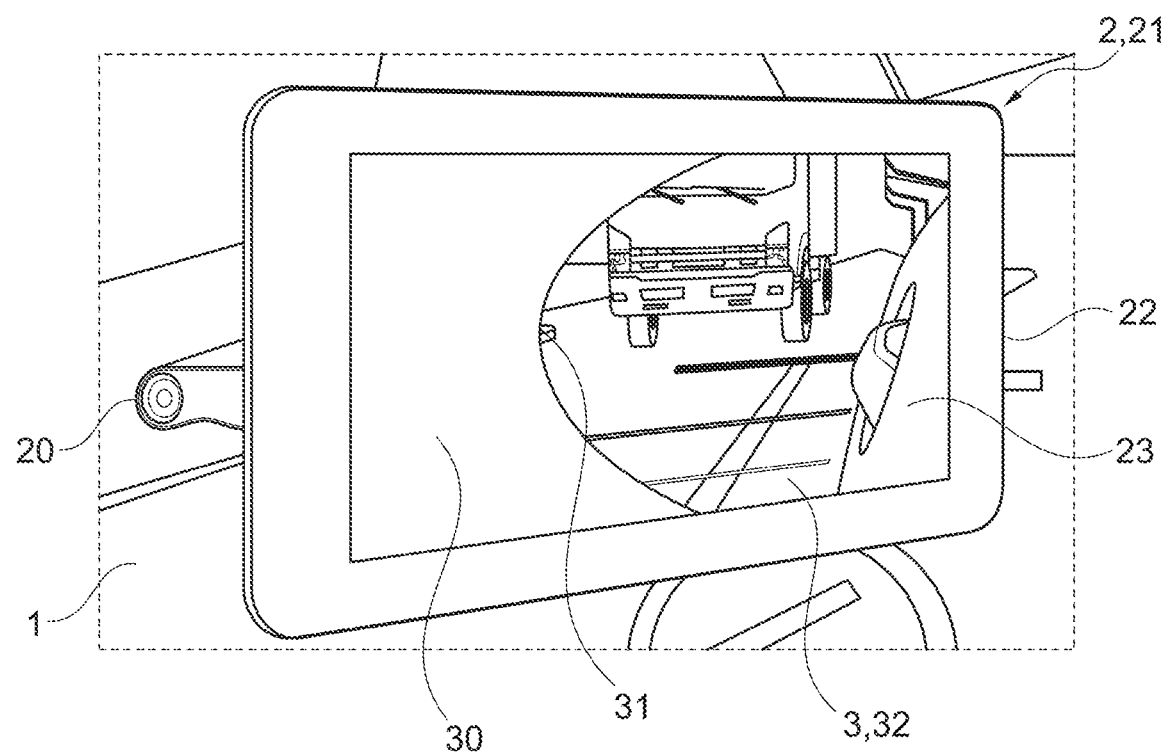
FIG. 7 is the virtual mirror device shown in FIG. 3 with a fourth partial overlay.

FIG. 7 shows the virtual mirror device 2 with a fourth partial overlay 30. The partial overlay 30 has the same contour as shown in FIGS. 5 and 6, but the partial overlay 30 with concave rim section 31 has a texture visually simulating a different predetermined surface.

In an example embodiment the internal surface 1 has the screen 23, the screen 23 being smoothly integrated therein, and the predetermined surface simulated by the partial overlay 30 and/or the tinted particles embedded in the screen 23 match the internal surface 1 surrounding the screen 23 in order to provide a particular aesthetic appearance of the screen 23.

During operation of the virtual mirror device 2 the camera 20 subsequently captures images 3 of the scene behind the vehicle and generates a video stream of images 30 thereof. The image processing unit 21 processes the generated video stream by inserting a constant partial overlay 30 into each image 3 of the video stream dependent on at least one parameter characteristic for a driving situation of the vehicle, preferably being characteristic for the driving velocity, i.e. the partial overlay 3 is, for instance, inserted at any driving velocity exceeding a predetermined minimal driving velocity of the vehicle while no partial overlay is inserted at lower velocities. Alternatively or additionally, the partial overlay depends on at least one object being recognized by the pattern recognition module of the image processing unit 21.

The image processing unit 21 provides the partial overlay 30 with a texture for visually simulating the predetermined surface. The partial overlay 30 is contoured by the image processing unit 21 to simulate the contour of the conventional rear-view mirror 11. The color management system adjusts the coloring of each image 3 of the video stream for compensating the tint caused by the plurality of tinted particles embedded in the screen 23. The display unit 22 displays the processed video stream on the screen 23.

In an example embodiment the predetermined surface matches the internal surface 1 surrounding the screen 23. Alternatively or additionally, the predetermined surface may be suited to be selected by a driver of the vehicle.

The embodiments shown here are only examples of the present invention and must therefore not be understood as restrictive. Alternative embodiments considered by the skilled person are equally covered by the scope of protection of the present invention.

LIST OF REFERENCE NUMERALS 1 internal surface
10 door
11 conventional rear-view mirror
2 virtual mirror device
20 camera
21 image processing unit
22 display unit
23 screen
3 image
30 partial overlay
31 rim section
32 focused image portion

What is claimed is:

1. A method for providing one or more of a rear or a side view of a vehicle, comprising:
   generating a video stream of images subsequently captured by at least one camera of the vehicle or of a virtual mirror device of the vehicle;
   processing the generated video stream;
   displaying the generated video stream on at least one screen of a display unit of the vehicle or of the virtual mirror device,
   wherein the processing comprises inserting a partial overlay into each image of the video stream that the inserted partial overlay is at least one of constant, selectable, and textured by an image processing unit of the vehicle for visually simulating a predetermined surface, so that the predetermined surface matches a surface surrounding the screen in which the inserted partial overlay simulates an inner surface for the vehicle, being configured as a class A surface and having a screen smoothly integrated therein for providing the one or more of the rear or the side view.

2. The method according to claim 1, wherein the inserted partial overlay is textured by an image processing unit of the virtual mirror device of the vehicle.

3. The method according to claim 1, wherein the partial overlay is inserted dependent on at least one parameter characteristic for a driving situation of the vehicle including a characteristic for a driving velocity.

4. The method according to claim 3, wherein the partial overlay is inserted at any driving velocity exceeding a predetermined minimal driving velocity.

5. The method according to claim 1, wherein the partial overlay at least one of:
   covers up to around 30% of the screen,
   reduces the displayed video stream to a selected region of the screen, preferably determined by legal requirements and/or by the driver of the vehicle, and/or
   adapts the region of the screen displaying the video stream of images to the shape of an exterior mirror.

6. The method according to claim 1, wherein the partial overlay is contoured by the image processing unit to have at least one of:
   a concave rim section towards the vehicle body or to be dependent on at least one parameter characteristic for a driving situation, or
   at least one object being recognized by a pattern recognition module of the image processing unit.

7. The method according to claim 1, wherein a color management system of the image processing unit adjusts a coloring of each image of the video stream for compensating a tint caused by a plurality of tinted particles embedded in the screen.

8. A virtual mirror device for providing one or more of a rear or a side view of a vehicle, wherein the virtual mirror device comprises:
   at least one camera for subsequently capturing images and generating a video stream thereof; and
   a display screen for displaying the video stream,
   wherein the virtual mirror device is configured to perform a method comprising:
      generating a video stream of images subsequently captured by at least one camera of the vehicle or of the virtual mirror device of the vehicle;
      inserting a partial overlay into each image of the video stream, wherein the inserted partial overlay is at least one of constant, selectable, and textured for visually simulating a predetermined surface, so that the predetermined surface matches a surface surrounding the screen in which the inserted partial overlay simulates an inner surface for the vehicle, being configured as a class A surface and having a screen integrated therein for providing the one or more of the rear or the side view; and displaying the video stream on the display screen of the vehicle or of the virtual mirror device.

9. The virtual mirror device according to claim 8, wherein a display surface of the display screen is provided by at least one of a class A surface or having a bonded cover glass or plastic glass.

10. The virtual mirror device according to claim 9, wherein at least one of:
the display screen is a liquid crystal display, or
a plurality of tinted particles are provided by the display screen or a layer of the display screen.

11. An internal surface for a vehicle, comprising:
a class A surface; and
a screen integrated therein for providing one or more of a rear and side view using a virtual mirror device comprising:
at least one camera for subsequently capturing images and generating a video stream thereof; and
a display screen for displaying the video stream,
wherein the virtual mirror device is configured to perform a method comprising:
generating a video stream of images subsequently captured by at least one camera of the vehicle or of the virtual mirror device of the vehicle;
inserting a partial overlay into each image of the video stream, wherein the inserted partial overlay is at least one of constant, selectable, and textured for visually simulating a predetermined surface, so that the predetermined surface matches a surface surrounding the screen in which the inserted partial overlay simulates an inner surface for the vehicle, being configured as a class A surface and having a screen integrated therein for providing the one or more of the rear or the side view; and
displaying the video stream on the display screen of the vehicle or of the virtual mirror device.

12. A vehicle, comprising the internal surface of claim 11, wherein the internal surface is an internal surface of a door of the vehicle.

* * * * *